United States Patent [19]

Fauth et al.

[11] 4,185,081

[45] Jan. 22, 1980

[54] PROCEDURE FOR THE SYNTHESIS OF STOICHIOMETRIC PROPORTIONED INDIUM PHOSPHIDE

[75] Inventors: Thomas A. Fauth, Bedford; Joseph A. Adamski, Framingham, both of Mass.

[73] Assignee: The United States of America as represented by the Secretary of the Air Force, Washington, D.C.

[21] Appl. No.: 929,470

[22] Filed: Jul. 31, 1978

[51] Int. Cl.$^2$ ............................................. C01B 25/00
[52] U.S. Cl. ................................................... 423/299
[58] Field of Search ........................................ 423/299; 148/DIG. 3–DIG. 5

[56] References Cited

PUBLICATIONS

Klausatis et al., Rome Air Development Center, In House Report, RADC-TR-76-305, (Oct. 4, 1976).

Primary Examiner—O. R. Vertiz
Assistant Examiner—Wayne A. Lange
Attorney, Agent, or Firm—Joseph E. Rusz; William J. O'Brien

[57] ABSTRACT

A method for synthesizing indium phosphide that avoids the explosion problem which often occurs in the synthesis procedures which use the direct reaction of elemental phosphorus and elemental indium to produce indium phosphide. The method utilizes specific heating, pressurizing and cooling parameters to safely produce highly pure, stoichiometric, polycrystalline indium phosphide.

2 Claims, 1 Drawing Figure

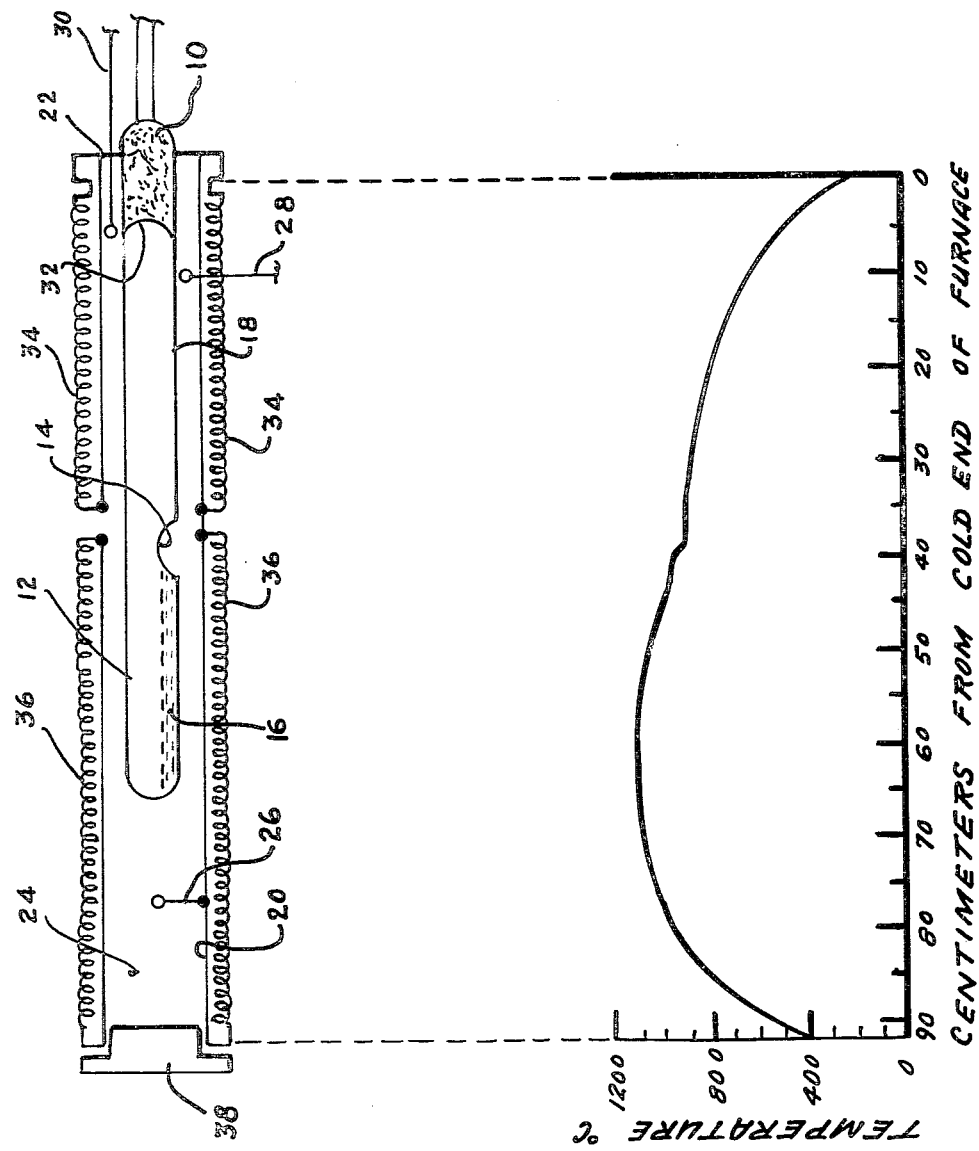

4,185,081

PROCEDURE FOR THE SYNTHESIS OF STOICHIOMETRIC PROPORTIONED INDIUM PHOSPHIDE

STATEMENT OF GOVERNMENT INTEREST

The invention described herein may be manufactured and used by or for the Government for governmental purposes without the payment of any royalty thereon.

BACKGROUND OF THE INVENTION

This invention relates to an improved crystalline semiconductor material and to an improved method for fabricating a highly pure, crystalline semiconductor having stoichiometric proportions. More particularly, this invention concerns itself with an improved method for producing highly pure, stoichiometric proportioned, indium phosphide crystalline materials especially useful as crystalline semiconductors or crystalline substrates for epitaxy procedures.

Indium phosphide, a group III-V semiconductor compound, has been found to be especially useful in two areas of technical interest. Its large band gap (1.35 eV) and high electron mobility make it useful as a semiconductor material, especially when employed in its highly pure form, and as a crystalline substrate for device fabrication by expitaxial deposition techniques. Thin film InP devices have great potential for use in integrated optic applications and high frequency microwave devices. However, it is extremely difficult to synthesize indium phosphide to the degree of purity necessary for its successful utilization as a thin film device.

A number of methods have been suggested for synthesizing indium phosphide. One method for growing fairly large crystals involves the direct reaction of elemental phosphorus with elemental indium. This method offers the advantage of producing a relatively pure product since there is no possibility of contamination by other reactants. Unfortunately, the reaction often leads to large pressure buildup with a resulting explosive potential. This method requires small, strongly sealed containers or bombs and is an expensive and dangerous method for conducting the reaction. Reaction methods involving compounds of indium and phosphorus, rather than elemental reactants, have also been suggested, but the resulting indium phosphide has often been lacking in the degree of purity needed to grow good single crystals.

Another method which has proven successful in producing highly pure product involves transporting phosphorus in the vapor phase from a source of solid red phosphorus in a first zone of a reaction vessel to a source of solid indium positioned in a second zone of the vessel which is thermally isolated from the first zone. This allows a reaction to occur at a controlled rate without overheating the phosphorus. Although this method provides a highly pure product, it nevertheless still suffers from an explosion problem in which explosions often occur during heating and cooling of the reaction vessel. A quartz ampoule is generally utilized as the reaction vessel and it was found that indium rich indium phosphide wetted and cracked the quartz. Then, the resulting high pressure of the phosphorus would cause the cracked quartz ampoule to explode.

In attempting to overcome this problem, it was found that if the phosphorus and indium were heated within narrow temperature ranges coupled with a specific programmed cooling cycle then explosions would not occur. The entire zone within the ampoule where the reaction between the solid indium and the phosphorus vapors occurs must be kept entirely within a narrow and limited temperature range of 1070° to 1150° C. while simultaneously maintaining the temperature at the red phosphorus interface at 546° C. Maintaining these narrow temperature ranges and resulting 27.5 atmospheres of pressure, as well as the specific programmed cooling rate, not only produces a highly pure product of stoichiometric proportions, but eliminates the danger of explosion.

SUMMARY OF THE INVENTION

The present invention concerns itself with a method for synthesizing stoichiometric indium phosphide without encountering the problems of explosion that occur when utilizing previously known methods of synethesis. The method involves placing a sample of red phosphorus in one end of a quartz ampoule and a sample of indium in the other end of the ampoule. The ampoule has a constricted center portion forming a vaporization zone for the red phosphorus and a reaction zone for the indium. The ampoule is sealed and placed in a suitable oven. The phosphorus interface is heated to 546° C. with a resulting pressure of 27.5 atmospheres resulting in the transportation of vapors to the reaction zone containing the indium. The entire reaction zone area is heated and maintained at a temperature between 1070° and 1150° C. during the complete reaction period. After completion of the reaction, the temperature of the indium phosphide reaction zone is lowered to a temperature between 950° C. to 1000° C. from 1150° C. in one hour to solidify the indium phosphide. Next, the 27.5 atmospheres of red phosphorus pressure is rapidly reduced in one hours time to 5 atmospheres pressure by simultaneously lowering the temperature of both the Indum phosphide and red phosphorus at variable rates of between 60° C./hr and 150° C./hr; and 90° C./hr and 180° C./hr, respectively. Unfortunately, the reaction often leads to a large pressure buildup with a resulting explosive potential. However, the stoichiometric indium phosphide produced by this invention does not wet the quartz ampoule and the explosive potential is negated. Also, the indium phosphide is easily removed from the ampoule.

Quartz boats may be inserted in the ampoule with the reaction ingredients, if desired, rather than placing the reaction ingredients directly into the ampoule itself. The resulting polycrystalline indium phosphide of this invention can then be used to grow high quality single crystals of indium-phosphide for various applications in accordance with conventional crystallization techniques.

Accordingly, the primary object of this invention is to provide a method for producing stoichiometric indium phosphide of high purity.

Another object of this invention is to provide a method for growing indium phosphide without encountering the explosion problem which occurs with previously known methods.

The above and still other objects and advantages of this invention will become more readily apparent upon consideration of the following detailed description of its preferred embodiments when taken in conjunction with the accompanying drawing.

In the Drawing:

The FIGURE represents a schematic illustration showing the temperature profile of the indium phosphide synthesis furnace with the reaction of this invention in progress.

DETAILED DESCRIPTION OF THE PREFERRED EMBODIMENT

Pursuant to the above-defined objects, this invention concerns itself with a method and reaction for synthesizing highly pure, stoichiometric indium phosphide. In essence the method of the invention involves the close control of two different temperature parameters and the corresponding pressure created during the reaction. Solid red phosphorus and solid indium are each positioned in a separate section or zone of a sealed quartz reaction vessel or ampoule. The procedure also controls the portion of the phosphorus in a region of the reaction vessel where there is temperature gradient which provides sufficient vapor pressure to drive the reaction:

$$4In + P_4 \rightarrow 4InP \quad (1)$$

in the direction of InP without exceeding the pressure limit of the quartz ampoule reaction vessel.

Indium phosphide single crystals are of particular importance for use in a number of applications. It is especially useful as a semiconductor material; and as a substrate material for use in crystalline expitaxial growth procedures. Unfortunately, previous methods of synthesizing this important crystalline material suffer a number of disadvantages. Those methods which are relatively safe do not produce crystalline material of sufficient purity. On the other hand, those methods capable of producing a highly pure product are considered relatively dangerous because of an explosion problem during cool-down after completing the synthesis reaction. Also, prior methods lack the capability of producing stoichromatic Indium phosphide because of their inability to effect a reaction at the necessary 27.5 atmospheres of pressure required for stoichiometry.

With the present invention however, this explosion problem has been overcome and crystalline material of high purity can be produced. In addition, the crystalline product is synthesized in stoichiometric proportions making it relatively easy to produce single crystals from the polycrystalline product produced by the invention. The basic method of this invention is known and involves transporting phosphorus in its vapor phase from a solid sample of phosphorus in one end of a sealed ampoule to a sample of liquid indium in another end of the ampoule which is thermally isolated from the phosphorus end of the ampoule. The ampoule is then placed in a conventional two zone furnace and heated sufficiently to effect a reaction between the phosphorus vapors and the indium. In order to minimize the explosion problem in the past; pressures were kept down in order to avoid fracturing the ampoule. Unfortunately, this prevented production of a stoichiometrically proportioned product and even with lowered pressures the explosion problem is not eliminated since catastrophic pressure buildup may occur during phosphorus vaporization.

Phosphorus occurs in several allotropic forms. At atmospheric pressure and room temperature it can exist as crystalline white phosphorus or as amorphous red phosphorus. White phosphorus is extremely reactive and poisonous and is likely to burst spontaneously into flame in the presence of oxygen. Red phosphorus is considerably less reactive and less toxic, but it must, nevertheless, be handled carefully. White phosphorus melts at about 50° C. to a liquid that resolidifies to red phosphorus at approximately 300° C. Red phosphorus remains solid from room temperature to approximately 600° C., at which point is melts to a clear, straw-colored liquid. The vapor pressure of this liquid increases very rapidly with increasing temperature (from approximately 50 atmospheres at the melting point) and is too high for laboratory glassware. Therefore, liquid phosphorus cannot be used. Since there is no advantage, and several disadvantages, to the use of white phosphorus, red phosphorus was chosen for this invention.

The technique of this invention consists of heating solid red phosphorus and solid indium to different temperatures in separate sections of a quartz ampoule, and controlling the position of the phosphorus in a region of the ampoule where there is a large temperature gradient, to provide sufficient vapor pressure to drive the chemical reaction in the direction of indium phosphide without exceeding the pressure limit of the ampoule. The indium, which melts at 156.2° C., must be maintained at a temperature higher than that of the phosphorus to prevent condensation of phosphorus at the indium end of the tube. If the indium is maintained at a temperature below about 1070° C., the melting point of InP, the product will precipitate as a powder, trapping some indium on its surface and preventing complete reaction. It is therefore, necessary to heat the indium to a temperature between 1070° to 1150° C.

The vapor pressure of phosphorus from InP at its melting point has been variously reported between 5 and 60 atmospheres. The value of 27.5 atmospheres is used in calculating the amount of phosphorus in excess of stoichiometry with which to charge the system. Using as starting materials, two 50 gm "ingots" of indium and chunks of red phosphorus in the amount of 30 gms, both 6 N pure, reactions are routinely run to 99 percent completion in 2 to 5 days, yielding approximately 127 gms batches of InP. The "hot" and "cold" ends of the ampoule are maintained at approximately 1150° C. and 546° C., respectively. The phosphorus must be carefully selected to insure that it contains no white phosphorus, in order to avoid spontaneous combustion during handling. The red phosphorus provided by various suppliers differs markedly in quality in this respect and when deposited in a layer on the ampoule is inferior to that supplied in chunks.

As shown in the FIGURE, 30 gms of phosphorus chunks are placed in one end 10 of a quartz ampoule 12 which is of a length sufficient to maintain the reaction zone at the desired temperature range of 1070° C. to 1150° C. The ampoule is constricted near its center 14. Approximately 100 g of indium is placed in section 16 of the tube 12. The masses chosen provide for stoichimetry plus 27.5 atmospheres overpressure of $P_4$ vapor in the available volume of the ampoule. The available volume of the ampoule changes very little as the reaction proceeds, as the volume of the InP, at a density of 4.81 g/cm$^3$, matches that of the indium and phosphorus, with densities of 7.31 and 2.34 g/cm$^3$ respectively, almost exactly.

The tube 12 is next evacuated and sealed off, leaving the indium and phosphorus in separate sections, with a constriction 14 between them that will permit the flow of vapor but prevent the passage of liquid between sections 16 and 18 when the ampoule is horizontal. The tube 12 is placed in a horizontal two-zone furnace 20 having an end cap 38, with the end 22 containing the phosphorus extending about 7 cm out of the furnace. The indium end 24, or hot end of the furnace, is simultaneously heated gradually to 1150° C., while the phosphorus end, or cold end 22, is heated to about 380° C. maximum which yields about 1 atmosphere pressure. The red phosphorus alone is then raised in temperature slowly to 546° C. (27.5 atmospheres pressure) which cause two things to occur. First, some of the red phosphorus will react with the molten indium. Then, the rest of the red phosphorus will be completely compacted in the cold end 22 of the ampoule. When the red phosphorus is completely compacted, the interface 32, which must have a temperature of 546° C., can be controlled in one of two ways. The temperature profile is manipulated by controlling the heating coil 34 to maintain the 546° C. temperature at the interface. Alternatively, the interface can be moved into that portion of the furnace heated to 546° C. by moving the entire ampoule into the furnace such that the interface remains at 546° C. The reaction zone 16 with the indium/indium phosphide must still be maintained at the desired temperature between 1070° and 1150° C. during synthesis. Maintaining control in the indium end is accomplished by manipulating the heating element 36 and employing an ampoule having a predetermined length such that the entire indium reaction zone of the ampoule is maintained within the desired temperature range of 1070° to 1150° C.

When the red phosphorus is completely sublimed, the synthesis is complete. However, as a practical measure at least one hour of soak time is added to insure that the interface temperature is not above or below 546° C. The temperatures are measured by control thermocouples 26 and 28. A third thermocouple 30, a monitoring thermocouple is inserted at the cold end 22 to locate the 546° C. point. As the temperature rises, the phosphorus in the warmer part of the ampoule vaporizes and redeposits at the cold end. This process insures that, so long as there is a surface below 546° C., no appreciable amount of phosphorus will be above 546° C., and there will be no danger of explosion. The initial extension of the ampoule out the cold end 22 of the furnace provides sufficient volume below 546° C. for all the phosphorus. As the redeposition proceeds, the ampoule is pushed into the furnace to keep the leading edge of the phosphorus at about 546° C. This process may take several hours. When it is complete, a distinct interface 32 will exist at about the 546° C. isotherm and at a pressure in the ampoule of about 27.5 atmospheres. The FIGURE shows the temperature profile of the furnace under the stated operating conditions and shows that there is a strong (50° C./cm) thermal gradient at this isotherm.

The vapor pressure of phosphorus in the ampoule is determined by the temperature of the interface at the phosphorus end. If this vapor pressure is greater than that which would result from the presence of InP in the molten indium, the excess vapor pressure will drive the reaction of indium with phosphorus to form more InP. As phosphorus is transported away from the phosphorus end, the interface moves back toward a cooler isotherm, and the driving pressure decreases toward the equilibrium vapor pressure at which the reaction would cease. To maintain the reaction, the ampoule is preferably pushed into the furnace until the phosphorus interface is brought back to the desired 546° C. temperature and the consequent higher vapor pressure of 27.5 atmospheres.

The method is carried out at full pressure of 27.5 atmospheres during synthesis. The procedure synthesizes the InP at the melting point of indium phosphide and therefore at the full 27.5 atmospheric pressure required for stoichiometric growth, otherwise the indium phosphide dissassociates under these conditions. The ampoule wall thickness, is designed to take 30 atmospheres of pressure and a quartz ampoule having a central constriction, can be used with or without quartz boats to contain the reaction ingredients. The particular temperatures of 546° C. at the red phosphorus interface and the 1070° to 1150° C. temperature at the indium/indium phosphide end must be maintained throughout the entire synthesis procedure to produce stoichiometric indium phosphide.

When the reaction has come to completion, the furnace is cooled in accordance with a programmed procedure involving specific cooling parameters. First, the temperature of the indium phosphide reaction zone is variably decreased from 1150° C. maximum to 1000° C. at a rate of between 50° C. per hour to 150° C. per hour while maintaining the full 27.5 atmospheres pressure. This directionally freezes the indium phosphide melt. The temperatures of both the InP and the red P are decreased simultaneously at variable rates of between 60° C. per hour and 150° C. per hour and 90° C. per hour and 180° C. per hour, respectively.

Since the temperatures are being reduced and the temperature controls the pressure of the red phosphorus, the red phosphorus is collected at the coolest end of the ampoule when the pressure is reduced. The total length of time for this step is about one to three hours. When the temperature of the red phosphorus end of the ampoule reaches about 380° C. (about one atmosphere red phosphorus pressure) and the indium phosphide end reaches about 750° C., the power to the furnace is turned off and the ampoule, indium phosphide product, and the red phosphorus are cooled to room temperature in situ.

The method of this invention for synthesizing stoichiometric indium phosphide has solved the explosion problems which have been known to occur with prior art vapor transport techniques. It was found that excess indium in the indium-rich-indium phosphide melt wetted the surface of the quartz ampoule and cracked the quartz upon expansion and solidification during cooling. The high pressure from the phosphorus then exploded the ampoule because of the weak wall described above.

This method has produced quantities of 127 grams of stoichiometric indium phosphide polycrystalline material with large grains of from 1 to 3 centimeters as determined by the Laue Back Reflection X-Ray Technique. The product is free from excess indium and does not wet the quartz ampoule in any way. It is easily removed from the ampoule. It provides an excellent material of sufficient quantity and quality for the subsequent growth of single crystals in accordance with standard crystallization techniques. The invention can also be adapted to produce many polycrystalline III-V compounds that are applicable for use in semiconductor technology.

While the invention has been described with particularity in reference to specific embodiments thereof, it should be understood that the disclosure of the present invention is for the purpose of illustration only, and is not intended to limit the invention in any way the scope of which is defined by the appended claims.

What is claimed is:

1. In a method for synthesizing highly pure stoichiometric porportioned, polycrystalline indium phosphide comprising the steps of:
   I. providing a reaction vessel having (1) a vaporization zone, (2) a reaction zone, and (3) a constricted, interconnecting, vapor transport passageway positioned therebetween;
   II. placing a solid sample of red phosphorus in said vaporization zone and a solid sample of indium in said reaction zone;
   III. heating the vaporization zone to a temperature and pressure sufficient to vaporize said red phosphorus and effect its transport to said reaction zone;
   IV. simultaneously heating said reaction-zone to melt said indium and effect a reaction between said phosphorus vapors and said molten indium;
   V. maintaining said temperatures for a period of time sufficient to complete said reaction and produce a stoichiometric proportioned, reaction product therefrom; and
   VI. cooling said reaction product and removing said product from said reaction vessel, the improvement which comprises the steps of:
   (a) heating said vaporization zone to a temperature of 546° C. and a resulting vapor pressure of 27.5 atmospheres,
   (b) heating said reaction zone to a temperature between a range of 1070° C. and 1150° C. and maintaining the entire reaction zone within said temperature range during the entirety of said reaction;
   (c) cooling the temperature of said reaction product from its maximum to a temperature between 950° and 1000° C. at a programmed variable cooling rate ranging from 50° C. per hour to 150° C. per hour; while simultaneously maintaining the temperature at the red phosphorus interface at 546° C.
   (d) simultaneously cooling the temperature of both the reaction product and the red phosphorus at programmed, variable cooling rates ranging from 60° C. per hour to 150° C. per hour and 90° C. per hour to 180° C. per hour, respectively;
   (e) continuing said programmed cooling until the temperature of the red phosphorus reaches about 380° C. and the indium phosphide reaches about 750° C., respectively; and
   (f) further cooling said red phosphorus and indium phosphide in situ to room temperature.

2. A method in accordance with claim 1 wherein said reaction zone is heated and maintained at a temperature of 1150° C.